United States Patent
Liang

(10) Patent No.: US 7,118,083 B2
(45) Date of Patent: Oct. 10, 2006

(54) PAPER HOLDER ATTACHED TO COMPUTER KEYBOARDS

(76) Inventor: Hui-Hu Liang, No. 3, Pao Chi Lane, Chung Ya Tsun, Siu Shui Hsiang, Changhua Hsien (TW)

( * ) Notice: Subject to any disclaimer, the term of this patent is extended or adjusted under 35 U.S.C. 154(b) by 247 days.

(21) Appl. No.: 10/778,141

(22) Filed: Feb. 17, 2004

(65) Prior Publication Data

US 2005/0178937 A1    Aug. 18, 2005

(51) Int. Cl.
*B41J 11/02* (2006.01)

(52) U.S. Cl. .................. 248/442.2; 248/918; 248/447; 248/448

(58) Field of Classification Search ............ 248/442.2, 248/447, 448, 458, 454
See application file for complete search history.

(56) References Cited

U.S. PATENT DOCUMENTS

| 4,582,285 | A | * | 4/1986 | Bello | ....................... 248/442.2 |
| 4,949,933 | A | * | 8/1990 | Stone | ....................... 248/442.2 |
| 5,340,073 | A | * | 8/1994 | Masakazu | ................ 248/291.1 |
| 5,497,970 | A | * | 3/1996 | Pursell, Jr. | ............... 248/442.2 |
| 6,877,707 | B1 | * | 4/2005 | Jones et al. | ............. 248/442.2 |

* cited by examiner

*Primary Examiner*—Kimberly Wood
*Assistant Examiner*—Steven Marsh
(74) *Attorney, Agent, or Firm*—Troxell Law Office, PLLC

(57) ABSTRACT

A paper holder attached to a computer keyboard including a keyboard, a holder rod pivotally coupled to the keyboard for being rotated to move the holder rod vertically up and down. The holder rod is folded and aligned at the same level of the keyboard, a circular rod base protruded from an inner surface of a main support rod of the holder rod, a long hole disposed on the circular rod base, a groove sequentially disposed on at the bottom of both sides of the long hole and the long hole of the circular rod base protruded from the bottom of the adjusting rod to couple with a locking member for the positioning. A rib correspondingly latched to the groove of the main support rod and disposed on the inner side of the locking member, and pressing against different grooves to drive the adjusting rod to move along the main support rod.

5 Claims, 6 Drawing Sheets

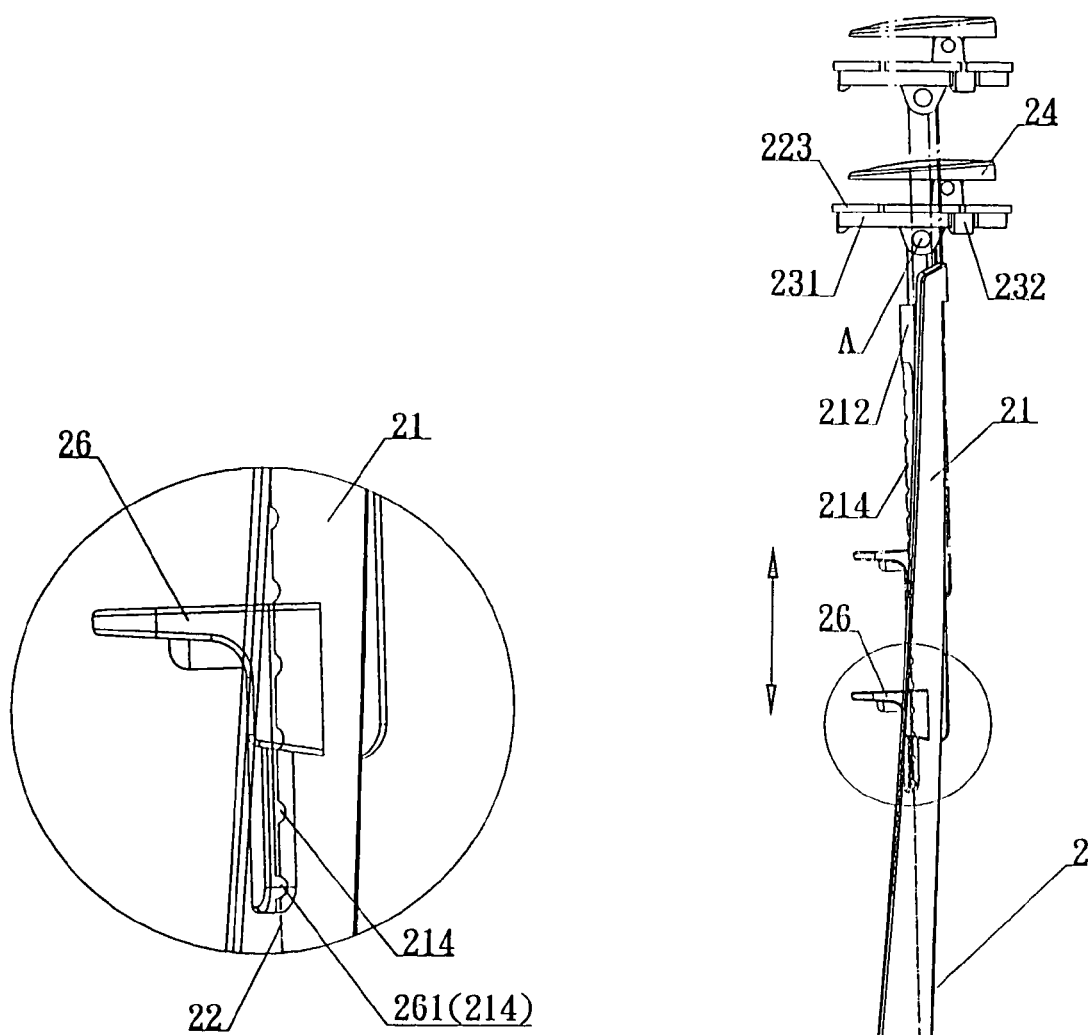
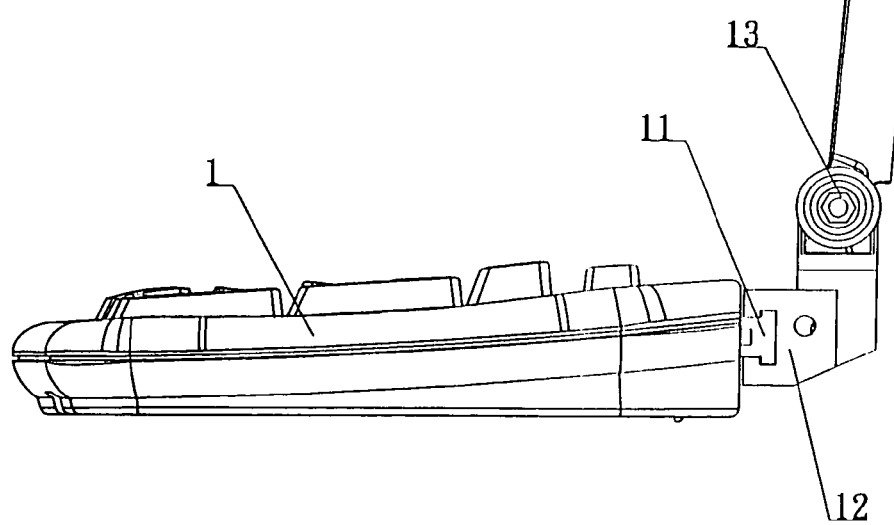
FIG. 4A
FIG. 4

PAPER HOLDER ATTACHED TO COMPUTER KEYBOARDS

BACKGROUND OF THE INVENTION

1. Field of the Invention

This invention relates to a paper holder attached to a computer keyboard, more particularly to a paper holder comprising a holder rod pivotally coupled with a keyboard for moving the holder rod vertically up and down and being folded and aligned and attached at the same level of the keyboard, an adjusting rod of the holder rod moving along the main support rod for providing different heights to the holder rod for user's viewing, and a retaining tray coupled with the top of the adjusting rod and capable of being rotated in 360 degrees with a latch position at every 90 degrees, such that the holder rod can be folded, aligned, and attached to the keyboard to minimize the space for storing the paper holder at the same level of the keyboard.

2. Description of the Related Art

In general, traditional paper holders are usually separated from computer keyboards, and most paper holders have a larger area at the bottom base for keeping the body of the holder rod in balance. However, such arrangement cannot align the holder rod of the paper holder at the same level with the keyboard, and thus occupying more space for the storage.

SUMMARY OF THE INVENTION

The objective of this invention is to provide a paper holder comprising a holder rod pivotally coupled with a keyboard for moving the holder rod vertically up and down and being folded, aligned, and attached to the keyboard at the same level, an adjusting rod of the holder rod being moved along the main support rod for providing different heights to the holder rod for user's viewing, and a retaining tray coupled with the top of the adjusting rod and capable of being rotated in 360 degrees with a latch position at every 90 degrees of rotation, such that the holder rod can be folded, aligned, and attached to the keyboard to minimize the space for storing the paper holder at the same level of the keyboard.

BRIEF DESCRIPTION OF THE DRAWINGS

Other features and advantages of the present invention will become apparent in the following detailed description of the preferred embodiments with reference to the accompanying drawings, in which:

FIG. 4 is a side view of the paper holder with the height of its holder rod being adjusted according to a preferred embodiment of the present invention.

FIG. 4A is an enlargement of part of FIG. 4.

DETAILED DESCRIPTION OF THE PREFERRED EMBODIMENTS

To make it easier for our examiner to understand the objective of the invention, its structure, innovative features, and performance, we use a preferred embodiment together with the attached drawings for the detailed description of the invention.

Figure 1:
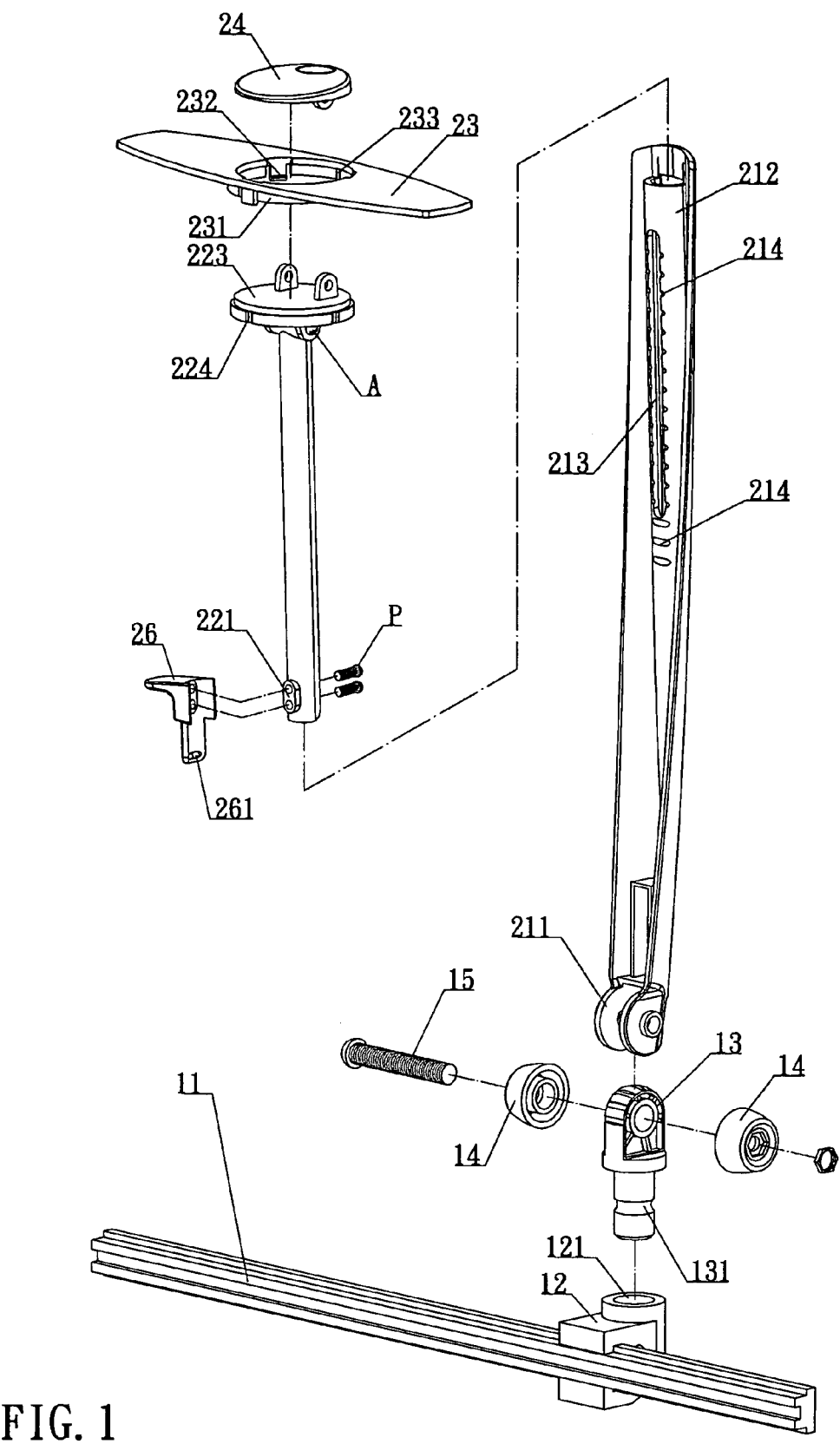
FIG. 1 is an exploded view of the paper holder of the present invention.
Figure 2:
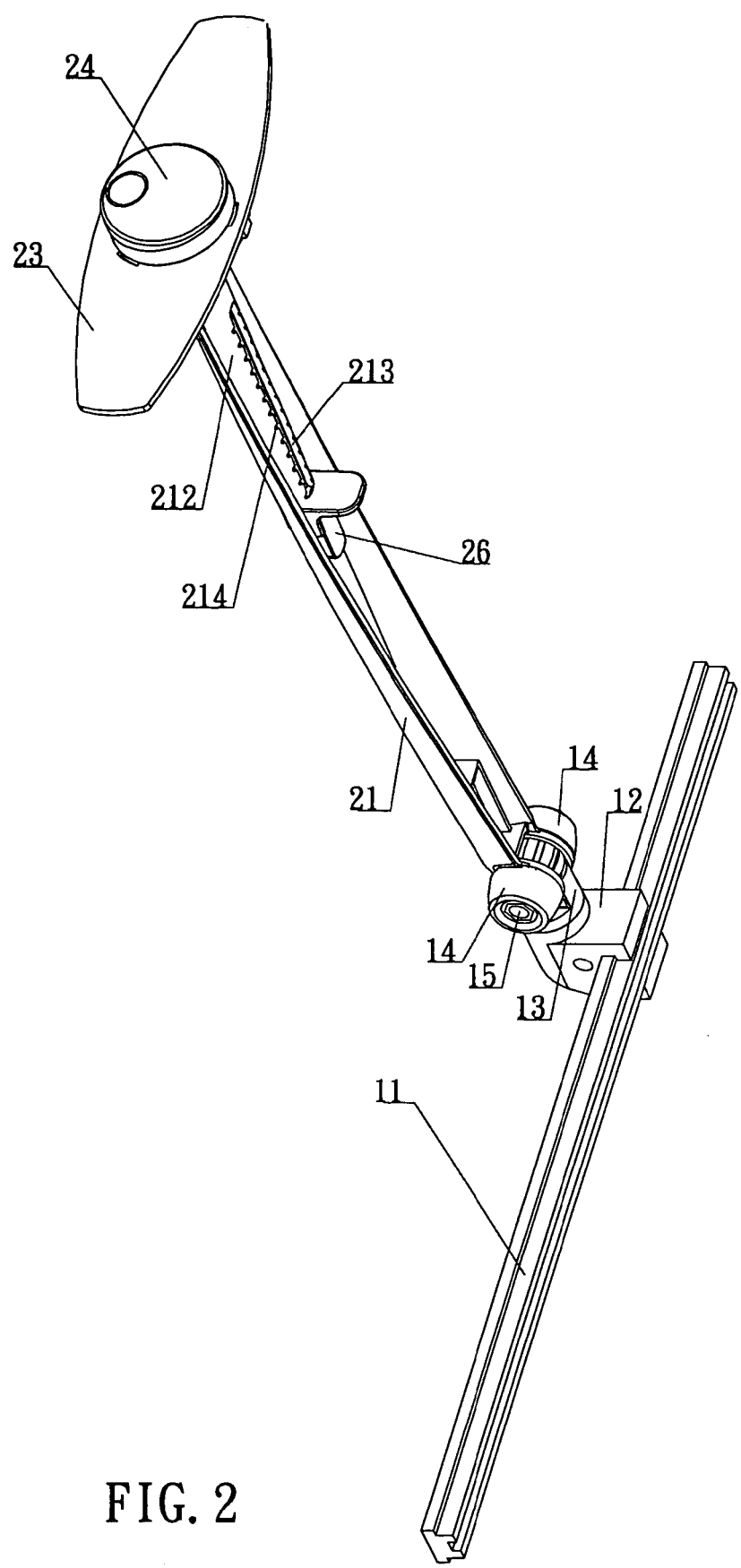
FIG. 2 is a perspective view of the assembled paper holder of the present invention.

Please refer to FIGS. 1 and 2 for the structural configuration of the present invention, which comprises a keyboard 1, a holder rod 2 pivotally coupled to the front end of the keyboard 1, wherein:

The keyboard 1 comprises a double T-shaped sliding track 11 protruded from the center of its front end, a sliding member 12 disposed on the sliding track 11 and having a corresponding engaging groove, and a positioning hole 121 at one end of the sliding member 12, and a convex ring (not labeled in the figure) is disposed at the inner edge of the positioning hole 121, and the positioning hole 121 has a pivotal member 13 disposed on the bottom of a concave ring 131, such that the concave ring 131 latches precisely into the convex ring of the positioning hole 121 to align and connect the holder rod 2 with the pivotal member 13 for rotating the holder rod 2 vertically up and down at the top of the pivotal member 13.

The holder rod 2 comprises a semicircular main support rod 21, an adjusting rod 22 located at the top of the main support rod 21, a retaining tray 23 fixed at the top of the adjusting rod 22, and a clamping means 24 fixed onto the top of the retaining tray by a torque spring; wherein:

The main support rod 21 at its bottom has a pivotal plate 211 inserted into the pivotal member 13, and the pivotal plate 211 is connected to the pivotal member 13 by a screw bolt 15 and a screw nut 14, and the main support rod 21 also has a circular rod base 212 protruded from a semicircular inner side to align and fix the adjusting rod 22, and the circular rod base 212 has a long hole 213, and a groove 214 sequentially disposed on both sides and the bottom of the long hole 213.

The adjusting-rod is inserted into the circular rod base 212 of the main support rod. 21, and the-bottom end 221 of the adjusting rod 22 is protruded from the long hole 213 on the inner side of the circular rod base 212 and fixed by a screw bolt P to secure a locking member 26 with the adjusting rod 22. The locking member 26 at its inner side has a rib 261 for aligning and latching with the groove 214 of the main support rod 21, and the rib 261 presses and latches with different grooves 214 to lock the adjusting rod 22 with the locking member 26 and drives the adjusting rod 22 to move at the circular rod base 212 of the main support rod 21. A corresponding circular fixing base 223 is pivotally coupled with the top of the adjusting rod 22 to provide a pivotal position as a fulcrum to move the retaining tray 23 vertically up and down and the fixing base 223 has a limit rib 224 for pivotally coupling the retaining tray 23 at every 90 degrees of rotation. An embedding ring 231 disposed on the periphery of the fixing base 223 at the position corresponding to the bottom of the retaining tray 23; a support clamp 232 is disposed at the periphery of the embedding ring 231 for mounting the retaining tray 23 onto the fixing base 223; and a limit groove 233 disposed on the inner side where the embedding ring 231 attaches with the fixing base 223 at an interval of every 90 degrees of rotation to allow the retaining tray 23 to rotate vertically or horizontally with an increment of 90 degrees at the top of the adjusting rod 22.

Figure 3:
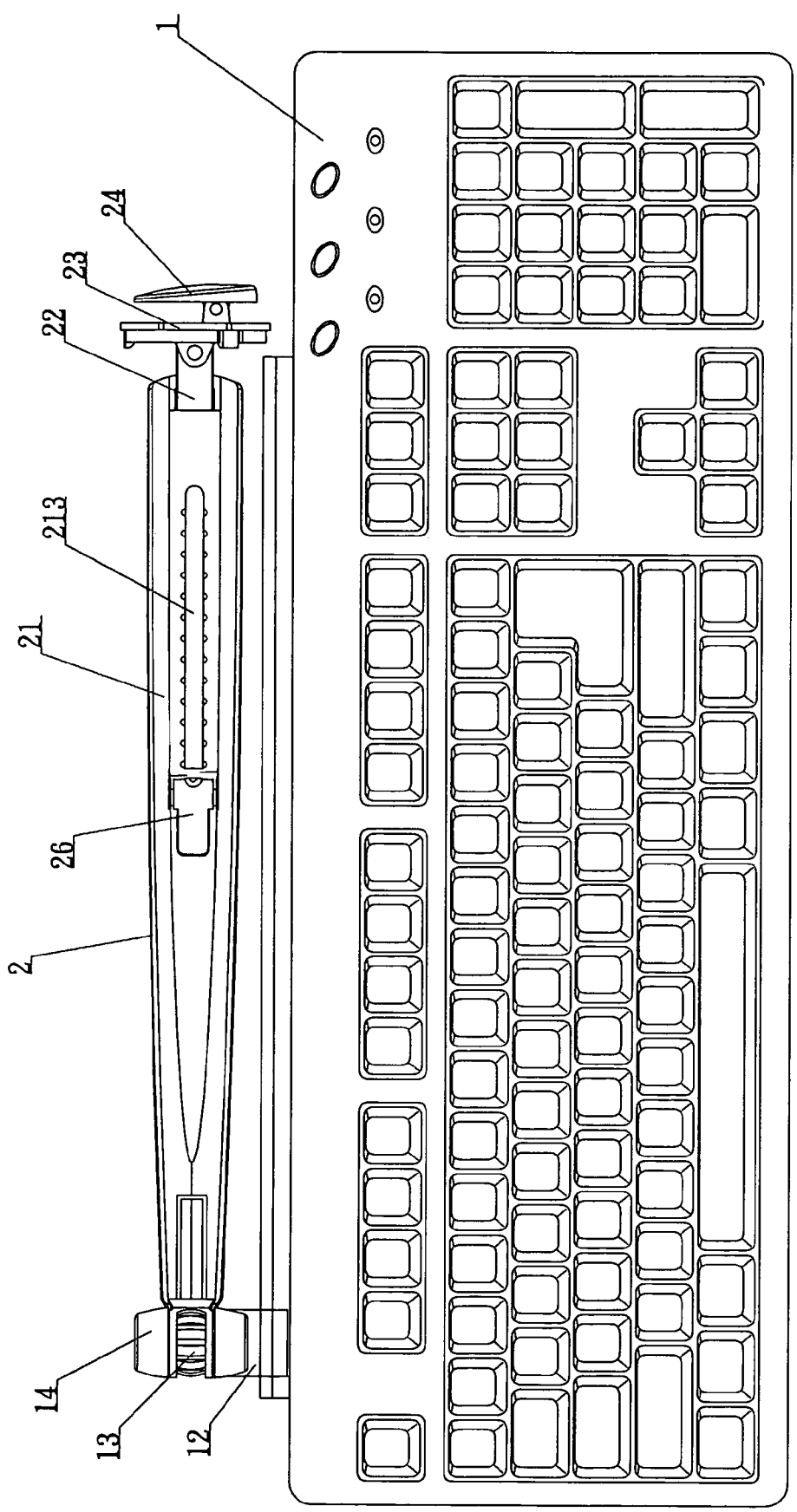
FIG. 3 is a planar view of the paper holder with its holder rod being folded at the same level of the computer keyboard according to a preferred embodiment of the present invention.

Please refer to FIGS. 3 to 6. A double T-shaped sliding track 11 is disposed at the front end of the keyboard 1; a sliding member 12 is embedded into the sliding track 11; and a pivotal member 13 is disposed on the other end of the sliding member 12 to pivotally connect the main support rod 21 with the pivotal member 13 by a screw nut 14 and a screw bolt 15, so that the holder rod 2 can rotate and move vertically up and down at the top of the pivotal member 13. Such arrangement allows the holder rod 2 to be folded and aligned at the same level with the keyboard 1 in order to minimize the storing space (as shown in FIG. 3).

By means of the long hole 213 disposed on the circular rod base 212 of the main support rod 21, the grooves 214 disposed on both sides and the bottom of the long hole 213, the bottom end of the adjusting rod 22 protruded out of the long hole 213 of the circular rod base 212 and locked by the locking member 26, and the rib 261 disposed on the inner side of the locking member 26 and corresponding latched into the groove 214 of the main support rod 21, and the rib 261 is pressed and latched into different grooves 214, so that the locking member 26 drives the adjusting rod 22 to move vertically up and down at the circular rod base 212 of the main support rod 21 to provide users the effect of holding documents at different heights for viewing (as shown in FIG. 4).

Figure 5:
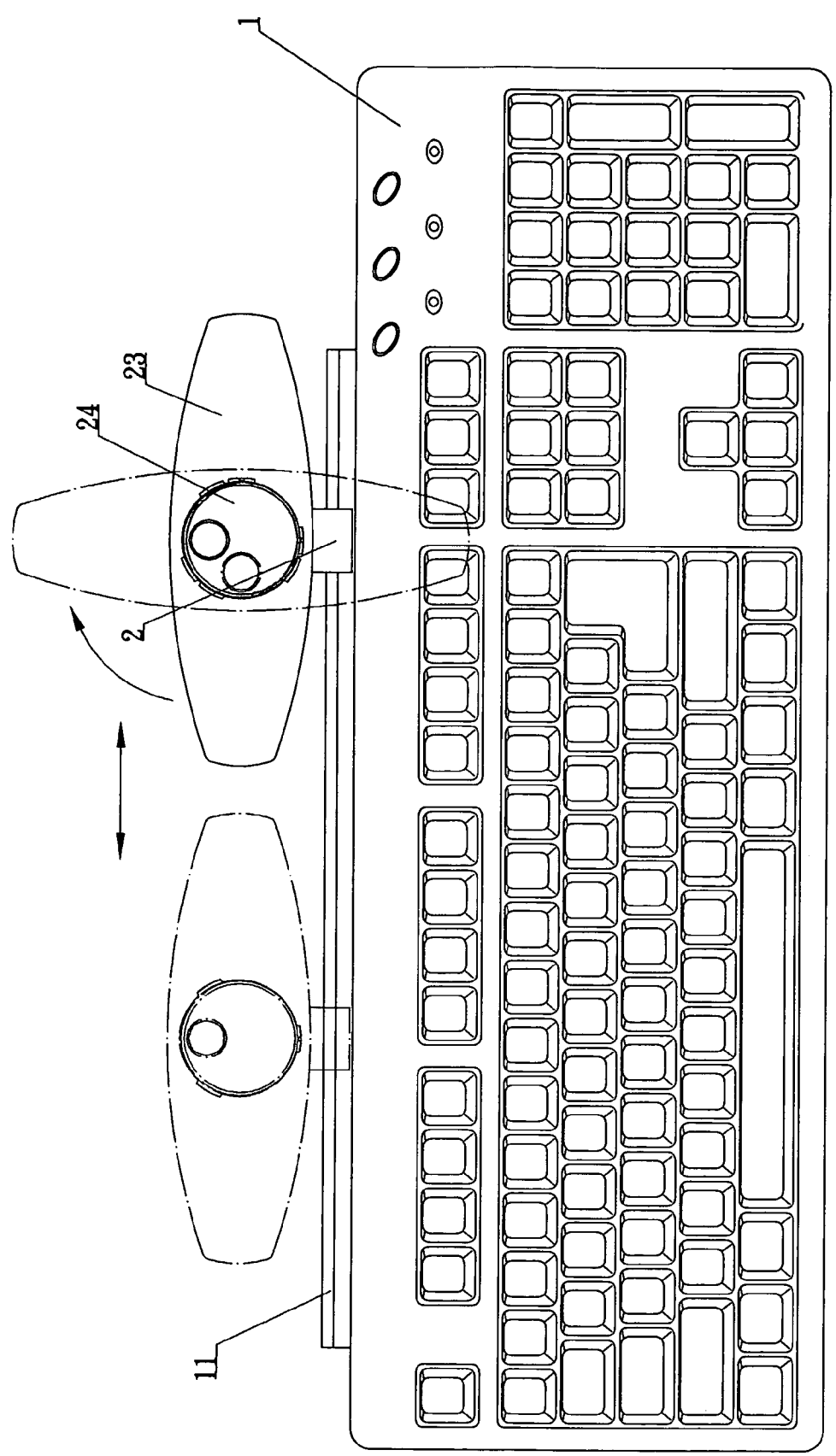
FIG. 5 is a view of the retaining tray being rotated vertically up and down according to a preferred embodiment of the present invention.

Further, a circular fixing base 223 is pivotally coupled to the top of the adjusting rod 22, and the fixing base 223 is coupled to the embedding ring 231 of the retaining tray 23 to provide a pivotal position A as the fulcrum to rotate and move the retaining tray 23 vertically up and down (as shown in FIG. 5). The fixing base 223 has a limit rib 224 at an interval of every 90 degrees of rotation.

Figure 6:
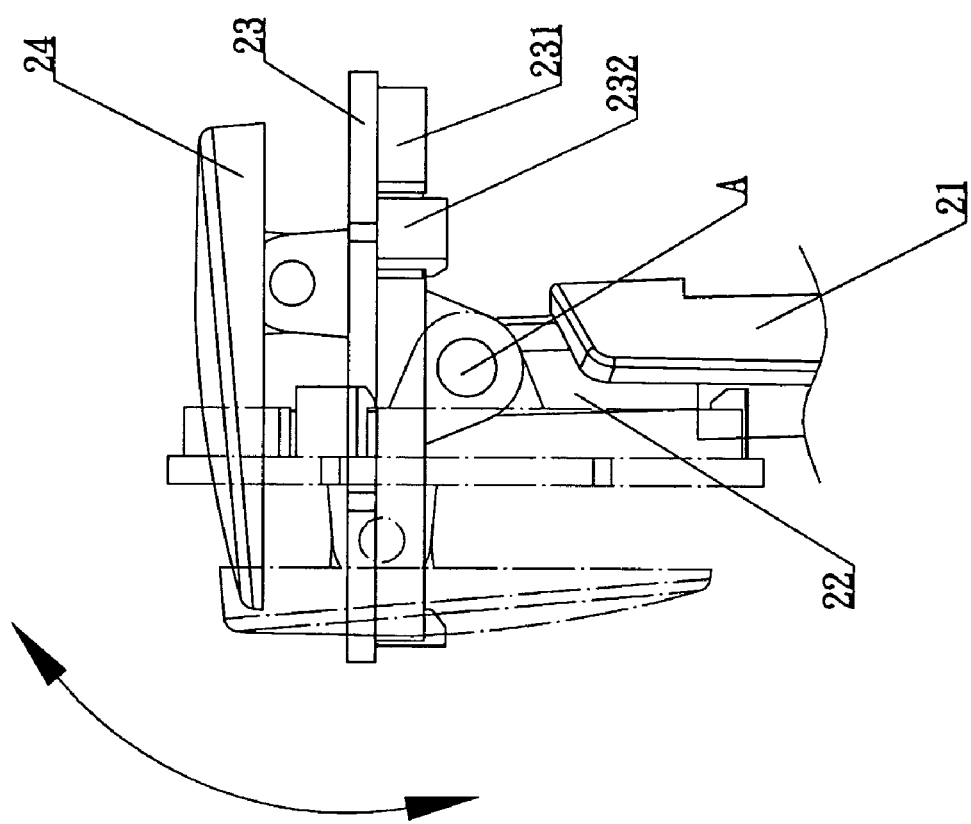
FIG. 6 is a view of the retaining tray being rotated horizontally in 360 degrees according to a preferred embodiment of the present invention.

Further, a limit groove 233 with an increment of every 90 degrees of rotation is disposed on the inner side of the retaining tray 23 where the embedding ring attaches with the fixing base 223 for rotating the retaining tray 23 in 360 degrees horizontally at the top of the adjusting rod 22, and giving a limit latch at every 90 degrees of rotation (as shown in FIG. 6).

While the present invention has been described in connection with what is considered the most practical and preferred embodiment, it is understood that the invention is not limited to the disclosed embodiments but is intended to cover various arrangements included within the spirit and scope of the broadest interpretation and equivalent arrangements.

What is claimed is:

1. A paper holder attached on computer keyboards, comprising a keyboard and a holder rod pivotally coupled at the front end of said keyboard, wherein:

a sliding track and a sliding member, being disposed at the front end of said keyboard, and said sliding member having a positioning hole at one end for latching a pivotal member and pivotally coupling said holder rod onto said pivotal member and rotating vertically up and down at the top of the pivotal member;

said holder rod further comprising a semicircular main support rod, an adjusting rod, a retaining tray, and a clamping means coupled to the top of said retaining tray; wherein the bottom of said main support rod is pivotally coupled on said pivotal member of said keyboard, and said main support rod has a circular rod base located on an inner surface thereof, and said circular rod base having a long hole, and a groove sequentially disposed on both sides and a bottom end of said long hole;

said adjusting rod being inserted into said circular rod base of said main support rod, and having a long hole protruded from the inner side of said circular rod base to couple and position a locking member, and said locking member having a rib aligning and latching into said groove of said main support rod, and said rib pressing against different grooves to drive said adjusting rod and move said main support rod, and having a circular coupling base pivotally coupled at the top end of said adjusting rod, and said coupling base having a limit rib at every 90 degrees to provide a latch for said retaining tray; said retaining tray at its bottom having an embedding ring at the periphery of said coupling base, and a limit groove being disposed on the inner side where said embedding ring coupling to said coupling base at an increment of every 90 degrees for rotating said retaining tray horizontally in 360 degrees at the top of said adjusting rod with a latch at every 90 degrees;

such that said holder rod is folded and aligned at the same level with said keyboard to minimize the storing space.

2. The paper holder of claim 1, wherein said sliding track disposed at the front end of said keyboard is in the shape of a double T and has a corresponding engaging groove, and said sliding member has a positioning hole at one end, and said positioning hole has a convex ring disposed on its inner edge and a corresponding concave ring disposed at the bottom of said pivotal member, such that said concave ring latches precisely into said convex ring to fix said pivotal member onto said sliding member.

3. The paper holder of claim 1, wherein said pivotal member comprises a pivotal plate inserted into said pivotal member and coupled with said pivotal member by the connection of a screw bolt, and said main support rod has a circular rod base protruded from the semicircular inner side to provide the alignment and insertion for said adjusting rod, and said circular rod base of said holder rod has a long hole and a groove individually disposed on both sides and the bottom end of said long hole.

4. The paper holder of claim 1, wherein said retaining tray comprises a support clamp embedded at the periphery of said embedding ring for fixing and supporting said retaining tray at the top of said fixing base.

5. The paper holder of claim 1, wherein said fixing base pivotally disposed at the top of said adjusting rod is coupled with said embedding ring of said retaining tray to provide a fulcrum for rotating said retaining tray to move said retaining tray vertically up and down.

* * * * *